(12) United States Patent
Jeong et al.

(10) Patent No.: US 11,774,558 B2
(45) Date of Patent: Oct. 3, 2023

(54) OPTICAL SCANNING DEVICE AND LIDAR SYSTEM INCLUDING THE SAME

(71) Applicant: SAMSUNG ELECTRONICS CO., LTD., Suwon-si (KR)

(72) Inventors: Byunggil Jeong, Anyang-si (KR); Jaeduck Jang, Suwon-si (KR); Duhyun Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 136 days.

(21) Appl. No.: 17/379,546

(22) Filed: Jul. 19, 2021

(65) Prior Publication Data
US 2021/0349190 A1     Nov. 11, 2021

Related U.S. Application Data

(63) Continuation of application No. 15/483,135, filed on Apr. 10, 2017, now Pat. No. 11,092,672.

(30) Foreign Application Priority Data

Aug. 31, 2016 (KR) .................. 10-2016-0111685

(51) Int. Cl.
*G01S 7/481*     (2006.01)
*G01S 17/42*     (2006.01)
(Continued)

(52) U.S. Cl.
CPC .......... *G01S 7/4817* (2013.01); *G01S 7/4814* (2013.01); *G01S 7/4815* (2013.01); *G01S 17/42* (2013.01);
(Continued)

(58) Field of Classification Search
None
See application file for complete search history.

(56) References Cited

U.S. PATENT DOCUMENTS

| | | |
|---|---|---|
| 5,600,487 A | 2/1997 | Kiyomoto et al. |
| 8,493,445 B2 | 7/2013 | Degnan, III et al. |

(Continued)

FOREIGN PATENT DOCUMENTS

| | | |
|---|---|---|
| EP | 2 221 638 A1 | 8/2010 |
| EP | 2 696 216 A2 | 2/2014 |

(Continued)

OTHER PUBLICATIONS

Extended European Search Report dated Jan. 23, 2018 in corresponding European Patent Application No. 17188524.7.

*Primary Examiner* — Eric L Bolda
(74) *Attorney, Agent, or Firm* — Sughrue Mion, PLLC (57) ABSTRACT

An optical scanning device includes a light source configured to emit first light in a first wavelength range and second light in a second wavelength range, a beam divider configured to allow the first light to travel in a first direction, and receive the second light, and allow the second light to travel in a second direction different from the first direction, a first optical modulator configured to receive the first light, and modulate a phase of the first light received by the first optical modulator to change a travelling direction of the first light received by the first optical modulator, and a second optical modulator configured to receive the second light, and modulate a phase of the second light received by the second optical modulator to change a travelling direction of the second light received by the second optical modulator.

10 Claims, 8 Drawing Sheets

(51) Int. Cl.
    *G02B 27/14*         (2006.01)
    *G02B 27/28*         (2006.01)
    *G02F 1/29*          (2006.01)

(52) U.S. Cl.
    CPC ......... *G02B 27/141* (2013.01); *G02B 27/283* (2013.01); *G02F 1/292* (2013.01); *G02F 1/291* (2021.01); *G02F 2203/50* (2013.01)

(56) References Cited

U.S. PATENT DOCUMENTS

| | | |
|---|---|---|
| 8,711,463 B2 | 4/2014 | Han et al. |
| 9,557,585 B1 | 1/2017 | Yap et al. |
| 9,804,264 B2 | 10/2017 | Villeneuve et al. |
| 2012/0038903 A1 | 2/2012 | Weimer et al. |
| 2012/0105824 A1 | 5/2012 | Ohtomo et al. |
| 2013/0208256 A1 | 8/2013 | Mamidipudi et al. |
| 2013/0242400 A1 | 9/2013 | Chen |
| 2015/0160347 A1 | 6/2015 | Zweigle et al. |
| 2016/0223723 A1 | 8/2016 | Han et al. |
| 2017/0082735 A1 | 3/2017 | Slobodyanyuk et al. |
| 2017/0090031 A1 | 3/2017 | Bondy et al. |
| 2017/0328988 A1 | 11/2017 | Magee et al. |
| 2017/0363887 A1 | 12/2017 | Uyeno et al. |

FOREIGN PATENT DOCUMENTS

| | | |
|---|---|---|
| EP | 2 696 216 A3 | 2/2014 |
| JP | 8-15560 A | 1/1996 |
| JP | 3400534 B2 | 4/2003 |
| KR | 10-0251045 B1 | 5/2000 |

OPTICAL SCANNING DEVICE AND LIDAR SYSTEM INCLUDING THE SAME

CROSS-REFERENCE TO RELATED APPLICATION

This application is a continuation of U.S. patent application Ser. No. 15/483,135, filed Apr. 10, 2017, which claims priority from Korean Patent Application No. 10-2016-0111685, filed on Aug. 31, 2016, in the Korean Intellectual Property Office, the disclosure of which is incorporated herein by reference in its entirety.

BACKGROUND

1. Field

Apparatuses consistent with example embodiments relate to optical scanning devices and LIDAR (light detection and ranging) systems including the optical scanning devices.

2. Description of the Related Art

A LIDAR system (LIDAR is an acronym of Light Detection And Ranging) is an object detection system using light. The LIDAR system may detect the location or speed of an object or may measure an atmospheric phenomenon by measuring reflection light after irradiating light to the air or an object.

Recently, as intelligent automobiles such as smart cars have been developed, an active function for handling an emergency situation is performed. That is, a situation that may endanger the safety of a driver and pedestrians is detected, e.g., the possibility of a sudden appearance of a pedestrian, an object in a dark area, an object in poor visibility conditions such as when raining, and/or a road damage are detected. A LIDAR system may be used as an object detecting system in an intelligent automobile.

The LIDAR system may detect objects in various directions by changing the irradiation directions of light. Thus, to realize a LIDAR system, an optical scanning technique to control the illumination direction of light is being developed.

SUMMARY

Example embodiments may address at least the above problems and/or disadvantages and other disadvantages not described above. Also, the example embodiments are not required to overcome the disadvantages described above, and may not overcome any of the problems described above.

Example embodiments provide optical scanning devices that control an illumination direction of light of at least two wavelength ranges and LIDAR systems including the optical scanning devices.

According to an aspect of an example embodiment, there is provided an optical scanning device including a light source configured to emit first light in a first wavelength range and second light in a second wavelength range, and a beam divider configured to receive the first light, and allow the first light received by the beam divider to travel in a first direction, and receive the second light, and allow the second light received by the beam divider to travel in a second direction different from the first direction. The optical scanning device further includes a first optical modulator configured to receive the first light, and modulate a phase of the first light received by the first optical modulator to change a travelling direction of the first light received by the first optical modulator, and a second optical modulator configured to receive the second light, and modulate a phase of the second light received by the second optical modulator to change a travelling direction of the second light received by the second optical modulator.

The first optical modulator may be further configured to emit the first light of which the travelling direction is changed, to the second optical modulator, the second optical modulator may be further configured to receive the first light emitted from the first optical modulator, and reflect the first light received by the second optical modulator, and emit the second light of which the travelling direction is changed, to the first optical modulator, and the first optical modulator may be further configured to receive the second light emitted from the second optical modulator, and reflect the second light received by the first optical modulator.

The beam divider may include a dichroic mirror configured to transmit the first light received by the beam divider, and reflect the second light received by the beam divider.

The first light may include a first polarized light, the second light may include a second polarized light, and the beam divider may include a polarization beam splitter configured to transmit the first light received by the beam divider, and reflect the second light received by the beam divider.

The first optical modulator may include first nano antennas configured to modulate the first light received by the first optical modulator, and the second optical modulator may include second nano antennas configured to modulate the second light received by the second optical modulator.

The first optical modulator may include a first substrate, and first nano antennas disposed on the first substrate, and the second optical modulator may include a second substrate, and second nano antennas disposed on the second substrate.

The optical scanning device may further include a first driving unit configured to apply a potential to the first nano antennas, and a second driving unit configured to apply a potential to the second nano antennas, the travelling direction of the first light received by the first optical modulator may be changed based on the potential applied by the first driving unit, and the travelling direction of the second light received by the second optical modulator may be changed based on the potential applied by the second driving unit.

Each of the first nano antennas and the second nano antennas may include a channel electrode, and sub-channel electrodes disposed in a direction perpendicular to the channel electrode.

The optical scanning device may further include an optical system interposed between the light source and the beam divider, the optical system being configured to control a size of a cross-section of each of the emitted first light and the emitted second light.

The first wavelength range may include a wavelength range from 850 nm to 950 nm, and the second wavelength range may include a wavelength range from 1300 nm to 1550 nm.

According to an aspect of another example embodiment, there is provided a light detection and ranging (LIDAR) system including an optical scanning device configured to irradiate, to an object, first light in a first wavelength range and second light in a second wavelength range, and control an irradiation direction of the first light and an irradiation direction of the second light, and a light measuring device configured to measure light that is reflected from the object to which the first light and the second light are irradiated.

The LIDAR system further includes a processor configured to determine information of either one or both of a location and a speed of the object, based on the measured light.

The optical scanning device may include a light source configured to emit the first light and the second light, a beam divider configured to receive the first light, and allow the first light received by the beam divider to travel in a first direction, and receive the second light, and allow the second light received by the beam divider to travel in a second direction different from the first direction, a first optical modulator configured to receive the first light, and modulate a phase of the first light received by the first optical modulator to change a travelling direction of the first light received by the first optical modulator, and a second optical modulator configured to receive the second light, and modulate a phase of the second light received by the second optical modulator to change a travelling direction of the second light received by the second optical modulator.

The first optical modulator may be further configured to emit the first light of which the travelling direction is changed, to the second optical modulator, the second optical modulator may be further configured to receive the first light emitted from the first optical modulator, and reflect the first light received by the second optical modulator, and emit the second light of which the travelling direction is changed, to the first optical modulator, and the first optical modulator may be further configured to receive the second light emitted from the second optical modulator, and reflect the second light received by the first optical modulator.

The beam divider may include a dichroic mirror configured to transmit the first light received by the beam divider, and reflect the second light received by the beam divider.

The first light may include a first polarized light, the second light may include a second polarized light, and the beam divider may include a polarization beam splitter configured to transmit the first light received by the beam divider, and reflect the second light received by the beam divider.

The first optical modulator may include a first substrate, and first nano antennas disposed on the first substrate, and the second optical modulator may include a second substrate, and second nano antennas disposed on the second substrate.

The optical scanning device may further include a first driving unit configured to apply a potential to the first nano antennas, and a second driving unit configured to apply a potential to the second nano antennas, the travelling direction of the first light received by the first optical modulator may be changed based on the potential applied by the first driving unit, and the travelling direction of the second light received by the second optical modulator may be changed based on the potential applied by the second driving unit.

Each of the first nano antennas and the second nano antennas may include a channel electrode, and sub-channel electrodes disposed in a direction perpendicular to the channel electrode.

According to an aspect of still another example embodiment, there is provided an optical scanning device including a light source configured to emit first light in a first wavelength range and second light in a second wavelength range, and a beam divider configured to receive the first light, and allow the first light received by the beam divider to pass through the beam divider, and receive the second light, and reflect the second light received by the beam divider. The optical scanning device further includes a first optical modulator, and a second optical modulator. The first optical modulator is configured to receive the first light passed through the beam divider, and reflect the first light received by the first optical modulator to the second optical modulator, and the second optical modulator is configured to receive the second light reflected by the beam divider, and reflect the second light received by the second optical modulator to the first optical modulator.

The first optical modulator may be further configured to receive the second light reflected by the second optical modulator, and reflect the second light received by the first optical modulator to the beam divider, and the second optical modulator may be further configured to receive the first light reflected by the first optical modulator, and reflect the first light received by the second optical modulator to the beam divider.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions may not be described in detail because they would obscure the description with unnecessary detail.

Terminologies used herein are selected as commonly used by those of ordinary skill in the art in consideration of functions of the example embodiments, but may vary according to the technical intention, precedents, or a disclosure of a new technology. Also, some terms are arbitrarily selected by the applicant, and in this case, the meanings of the terms will be described in detail at corresponding parts of the specification. Accordingly, the terms used in the specification may be defined not by simply the names of the terms but based on the meaning and contents of the whole specification.

In the descriptions of the example embodiments, it will be understood that, when an element is referred to as being connected to another element, it may include electrically connected when the element is directly connected to the other element and when the element is indirectly connected to the other element by intervening a constituent element. Also, it may be understood that, when a part "comprises" or "includes" a constituent element in the specification, unless otherwise defined, it is not excluding other elements but may further include other elements. Also, in the specification, the term "units" or "modules" denote units or modules that process at least one function or operation, and may be realized by hardware, software, or a combination of hardware and software.

It will be understood that, although the terms "first," "second," etc. may be used herein to describe various elements, these elements may not be limited by these terms. These terms are only used to distinguish one element from another. The terminologies used herein are for the purpose of describing the example embodiments only and are not intended to be limiting of the example embodiments.

The descriptions of the example embodiments may not be interpreted as limiting the scope of right, and example embodiments that are readily inferred from the detailed descriptions and example embodiments by those of ordinary skill in the art will be construed as being included in the example embodiments.

Figure 1:
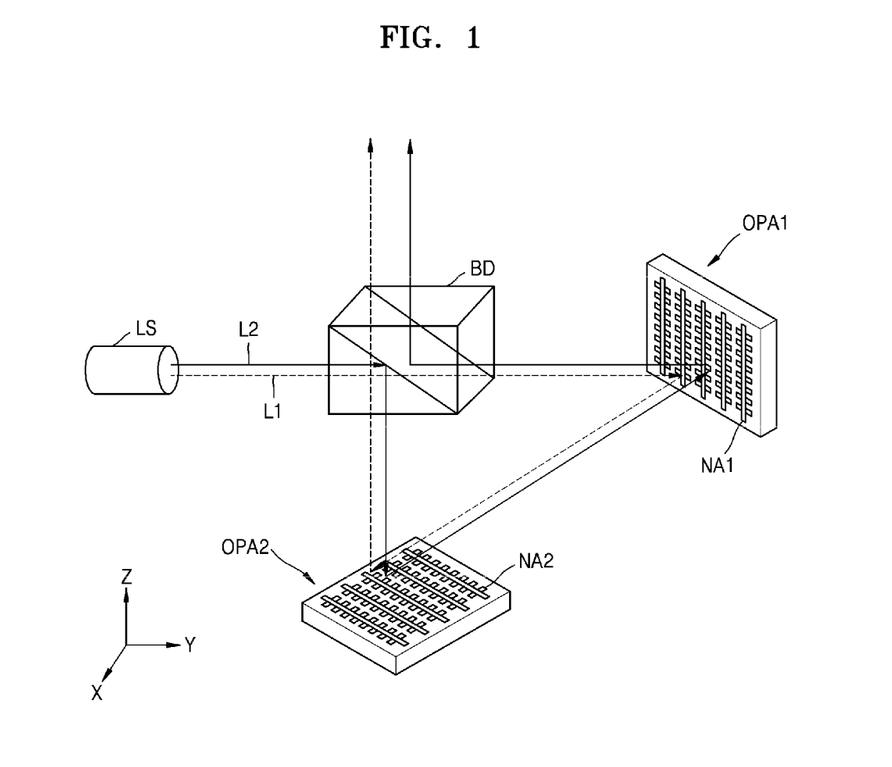
FIG. 1 is a schematic view of an optical scanning device according to an example embodiment.

FIG. 1 is a schematic view of an optical scanning device according to example an example embodiment.

Referring to FIG. 1, the optical scanning device according to the current example embodiment may include a light source LS configured to irradiate light, and a beam divider BD that receives the light irradiated by the light source LS. The beam divider BD allows first light L1 that includes a first wavelength range component of the light to travel in a first direction (a y-axis direction), and also allows second light L2 that includes a second wavelength range component of the light to travel in a second direction (a z-axis direction) different from the first direction (the y-axis direction).

Also, the optical scanning device may include a first optical modulator OPA1 that receives the first light L1 emitted from the beam divider BD and changes the travelling direction of the first light L1 by modulating a phase thereof, and a second optical modulator OPA2 that receives the second light L2 emitted from the beam divider BD and changes the travelling direction of the second light L2 by modulating a phase thereof.

The light source LS may irradiate light in a plurality of wavelength ranges. Light emitted by the light source LS may include the first light L1 having the first wavelength range component and the second light L2 having the second wavelength range component. The first light L1 and the second light L2 may each be monochromic light. However, the current example embodiment is not limited thereto. That is, the first light L1 and the second light L2 may have different wavelength spectrums from each other. In this case, a wavelength on which a spectrum of the first light L1 is formed and a wavelength on which a spectrum of the second light L2 is formed may be different from each other. Also, the light source LS may emit light having three wavelength range components or more.

In FIG. 1, only a single light source LS is depicted. However, more than two light sources LS may be used. For example, the light source LS may include a first light source that emits the first light L1 and a second light source that emits the second light L2.

The first and second lights L1 and L2 may enter the beam divider BD. The beam divider BD may control the first and second lights L1 and L2 to proceed in directions different from each other. That is, the beam divider BD may divide light emitted from the light source LS. Of the light emitted from the light source LS, the beam divider BD may allow the first light L1 to travel in the first direction (a y-axis direction) and the second light L2 to travel in the second direction (the z-axis direction). However, the first and second directions are just examples, and thus, the current example embodiment is not limited thereto. For example, an angle between the first and second directions may not be 90 degrees as shown in FIG. 1.

According to an example embodiment, the beam divider BD may include a dichroic mirror. The dichroic mirror may selectively reflect light of a predetermined wavelength range. Accordingly, the beam divider BD may divide the light emitted from the light source LS based on wavelengths thereof. For example, the first light L1 having a first wavelength range component may be transmitted by the dichroic mirror, and the second light L2 having a second wavelength range component may be reflected by the dichroic mirror. An angle between the first direction in which the first light L1 travels and the second direction in which the second light L2 travels may vary according to an arrangement angle of the dichroic mirror included in the beam divider BD.

In another example embodiment, the beam divider BD may include a polarization beam splitter (PBS). The PBS may selectively reflect light of a predetermined polarization component. The beam divider BD may divide light emitted from the light source LS based on polarization components thereof. For example, the light source LS may emit the first light L1 of a first polarization light and the second light L2 of a second polarization light. The first and second polarization lights may be polarization lights in different directions from each other. The beam divider BD may transmit the first light L1 having the first polarization light and may reflect the second light L2 having the second polarization light. As a result, the beam divider BD may make the first light L1 having a first wavelength range component and the second light L2 having a second wavelength range component to proceed in different directions from each other. An angle between the first direction in which the first light L1 travels and the second direction in which the second light L2 travels may vary according to an arrangement angle of the PBS included in the beam divider BD.

The first light L1 emitted from the beam divider BD may enter the first optical modulator OPA1. The first optical modulator OPA1 may change the travelling direction of the first light L1 by modulating a phase of the first light L1. The second light L2 emitted from the beam divider BD may enter the second optical modulator OPA2. The second optical modulator OPA2 may change the travelling direction of the second light L2 by modulating a phase of the second light L2.

The first optical modulator OPA1 may include a plurality of first nano antennas NA1. Also, the second optical modulator OPA2 may include a plurality of second nano antennas NA2. The first nano antennas NA1 may modulate the phase of the first wavelength component of light by generating a resonance with the first wavelength component of the first light L1. Accordingly, the first optical modulator OPA1 may selectively modulate the phase of the first light L1 that includes the first wavelength component region of the light. Likewise, the second nano antennas NA2 may modulate the phase of the second wavelength component of the second light L2 by generating a resonance with the first wavelength component of the light. Accordingly, the second optical modulator OPA2 may selectively modulate the phase of the second light L2 that includes the second wavelength component of the light.

Figure 2:
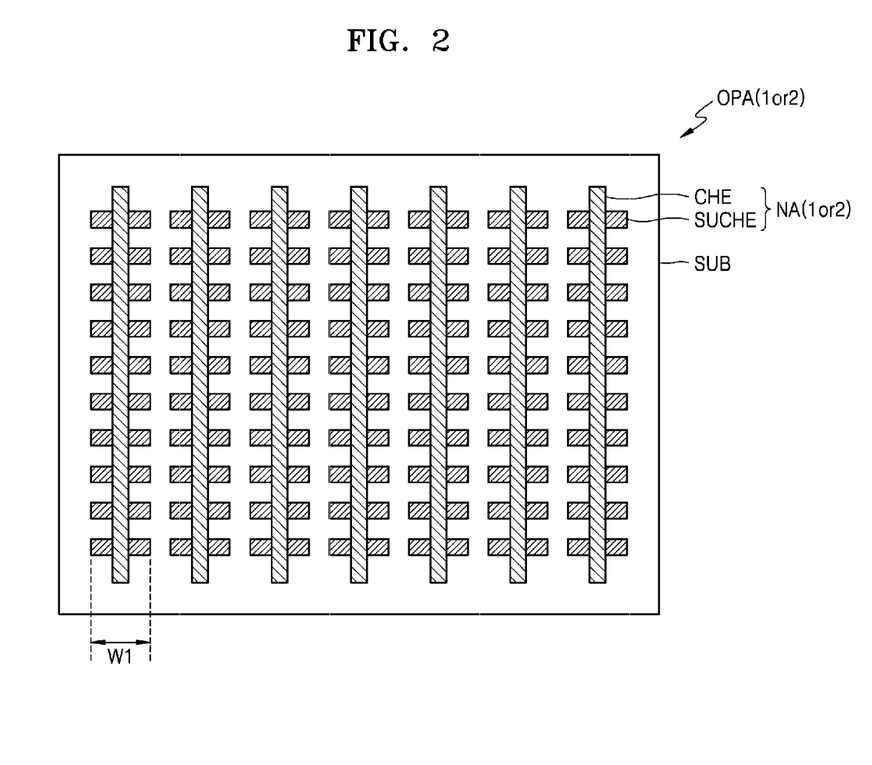
FIG. 2 is a schematic view of a surface of a first optical modulator or a second optical modulator of FIG. 1, according to an example embodiment.

FIG. 2 is a schematic view of a surface of the first optical modulator OPA1 or the second optical modulator OPA2 of FIG. 1, according to an example embodiment. According to an example embodiment, the first optical modulator OPA1 may be identical to the second optical modulator OPA2.

Referring to FIG. 2, the first optical modulator OPA1 may include a substrate SUB and a plurality of first nano antennas NA1 or a plurality of second nano antennas NA2 arranged on the substrate SUB. The phase of the first light L1 may be modulated due to mutual action with the first nano antennas NA1 when the first light L1 is reflected at the surface of the first optical modulator OPA1. As the phase of the first light L1 is modulated, the shape of a waveform of the first light L1 is changed, and as the shape of the waveform of the first light L1 is changed, the travelling direction of the first light L1 may be changed.

Each of the first nano antennas NA1 may form a single channel. Each of the first nano antennas NA1 may include a single channel electrode CHE and a plurality of sub-channel electrodes SUCHE formed in a perpendicular direction to the channel electrode CHE. Because the sub-channel electrodes SUCHE perpendicular to the channel electrode CHE are arranged parallel to each other, the first nano antennas NA1 may have a shape similar to a spine.

The channel electrode CHE and the sub-channel electrodes SUCHE may include a metal, such as Au or Cu. Also, an aluminum layer, an oxide aluminum layer, or a transparent metal (ITO) layer may be additionally provided between the channel electrode CHE and the sub-channel electrodes SUCHE. The first nano antennas NA1 may be configured to selectively modulate the phase of a first wavelength component of light. For example, a width W1 of the first nano antennas NA1 and the concentration of charge carriers accumulated on the first nano antennas NA1 may be differently set based on a wavelength value of the first wavelength component. Likewise, a width of the second nano antennas NA2 and the concentration of charge carriers accumulated on the second nano antennas NA2 may be differently set based on a wavelength value of the second wavelength component.

The first nano antennas NA1 shown in FIG. 1 may selectively modulate a phase of light having a predetermined polarization light of incident light. For example, the first nano antennas NA1 may selectively modulate the phase of light having a polarization component in a direction perpendicular to the channel electrode CHE, that is, in a direction parallel to the sub-channel electrodes SUCHE. In this case, the first optical modulator OPA1 may modulate light of incident light having a polarization component in a direction parallel to the sub-channel electrodes SUCHE by a resonance phenomenon, and may reflect light having a polarization component in a direction parallel to the channel electrode CHE.

Figure 3:
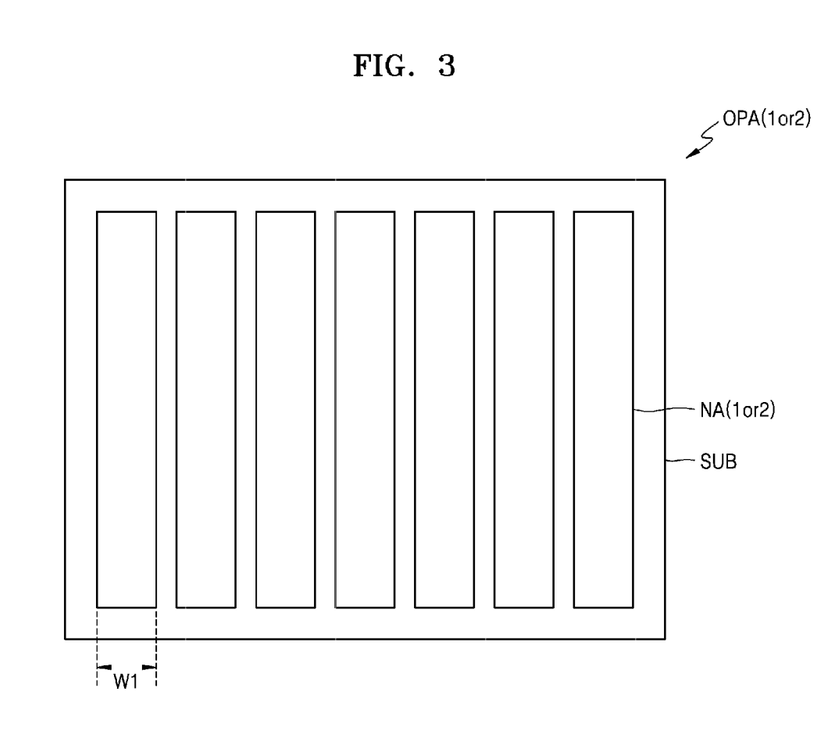
FIG. 3 is a schematic view of the surface of the first optical modulator or the second optical modulator of FIG. 1, according to another example embodiment.

FIG. 3 is a schematic view of a surface of first optical modulator OPA1 or the second optical modulator OPA2 of FIG. 1, according to another example embodiment. The example embodiment of the first optical modulator OPA1 shown in FIG. 3 may also be applied to the second optical modulator OPA2.

Referring to FIG. 3, the first optical modulator OPA1 may include the substrate SUB and the plurality of first nano antennas NA1 or the plurality of second nano antennas NA2 arranged on the substrate SUB. The first nano antennas NA1 may not include the sub-channel electrodes SUCHE of FIG. 2. The first nano antennas NA1 may be configured to selectively modulate a phase of the first wavelength component of light. For example, a width W1 of the first nano antennas NA1 and the concentration of charge carriers accumulated on the first nano antennas NA1 may be differently set based on a wavelength value of the first wavelength component. Likewise, a width of the second nano antennas NA2 and the concentration of charge carriers accumulated on the second nano antennas NA2 may be differently set based on a wavelength value of the second wavelength component.

The first and second optical modulators OPA1 and OPA2 have been described with reference to FIGS. 2 and 3. However, the example embodiments are not limited to the above descriptions. For example, the first and second nano antennas NA1 and NA2 may have shapes different from the shape shown in FIGS. 2 and 3. Also, the first and second optical modulators OPA1 and OPA2 may include a meta-surface optical device that can change a phase of light.

Referring to FIG. 1, the first light L1, the travelling direction of which is changed due to the phase modulation by the first optical modulator OPA1, may enter the second optical modulator OPA2. The second nano antennas NA2 of the second optical modulator OPA2 selectively modulate the phase of the second wavelength component of light, and thus, the first light L1 may be reflected at the second optical modulator OPA2. That is, the first light L1 may have no phase change except for the reflection. The first light L1 reflected at the second optical modulator OPA2 may be irradiated to the outside of the optical scanning device through the beam divider BD. Because the first light L1 is reflected at the second optical modulator OPA2, a direction in which the first light L1 is irradiated to the outside from the optical scanning device may depend on how the first optical modulator OPA1 modulates the phase of the first light L1.

The second light L2, the travelling direction of which is changed due to the phase modulation by the second optical modulator OPA2, may enter the first optical modulator OPA1. The first nano antennas NA1 of the first optical modulator OPA1 selectively modulate the phase of the first wavelength component of light, and thus, the second light L2 may be reflected at the first optical modulator OPA1. That is, the second light L2 may have no phase change except for the reflection. The second light L2 reflected at the first optical modulator OPA1 may be re-reflected at the beam divider BD and may be irradiated to the outside of the optical scanning device. Because the second light L2 is reflected at the first optical modulator OPA1, a direction in which the second light L2 is irradiated to the outside from the optical scanning device may depend on how the second optical modulator OPA2 modulates the phase of the second light L2.

Figure 4:
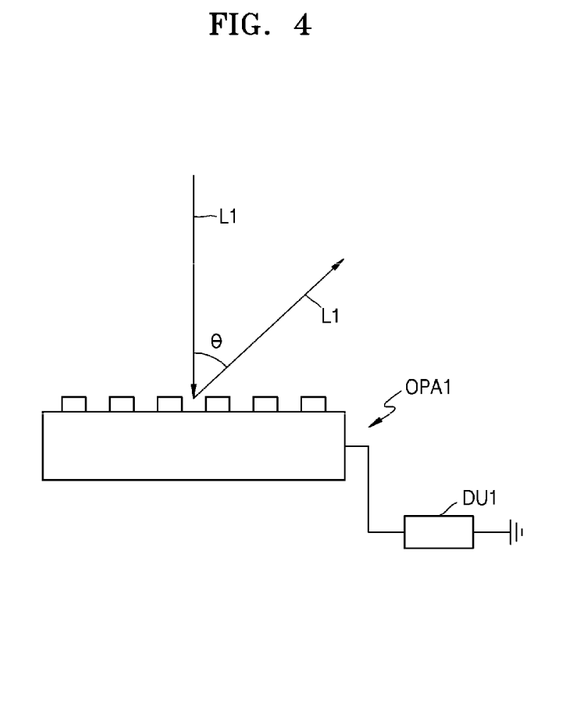
FIG. 4 is a cross-sectional view illustrating a change of a travelling direction of first light that is caused by the first optical modulator of FIG. 1, according to an example embodiment.

FIG. 4 is a cross-sectional view illustrating a change of a travelling direction of the first light L1 that is caused by the first optical modulator OPA1 of FIG. 1, according to an example embodiment.

Referring to FIG. 4, the first optical modulator OPA1 may include a first driving unit DU1 that applies a potential to the first nano antennas NA1 included in the first optical modulator OPA1. The first driving unit DU1 may apply a potential of the same magnitude. As another example, the first driving unit DU1 may apply potentials of different magnitudes respectively to the first nano antennas NA1. The concentration of the charge carriers stored in the first nano antennas NA1 may vary based on the magnitudes of potentials applied to the first nano antennas NA1. Based on the concentration of the charge carriers stored in the first nano antennas NA1, the first nano antennas NA1 may differently change the phase of the first light L1. Accordingly, the travelling direction of the first light L1 emitted from the first optical modulator OPA1 may depend on the potential applied to the first nano antennas NA1 by the first driving unit DU1. Likewise, the travelling direction of the second light L2 emitted from the second optical modulator OPA2 may depend on the potential applied to the second nano antennas NA2 by a second driving unit DU2.

Figure 5:
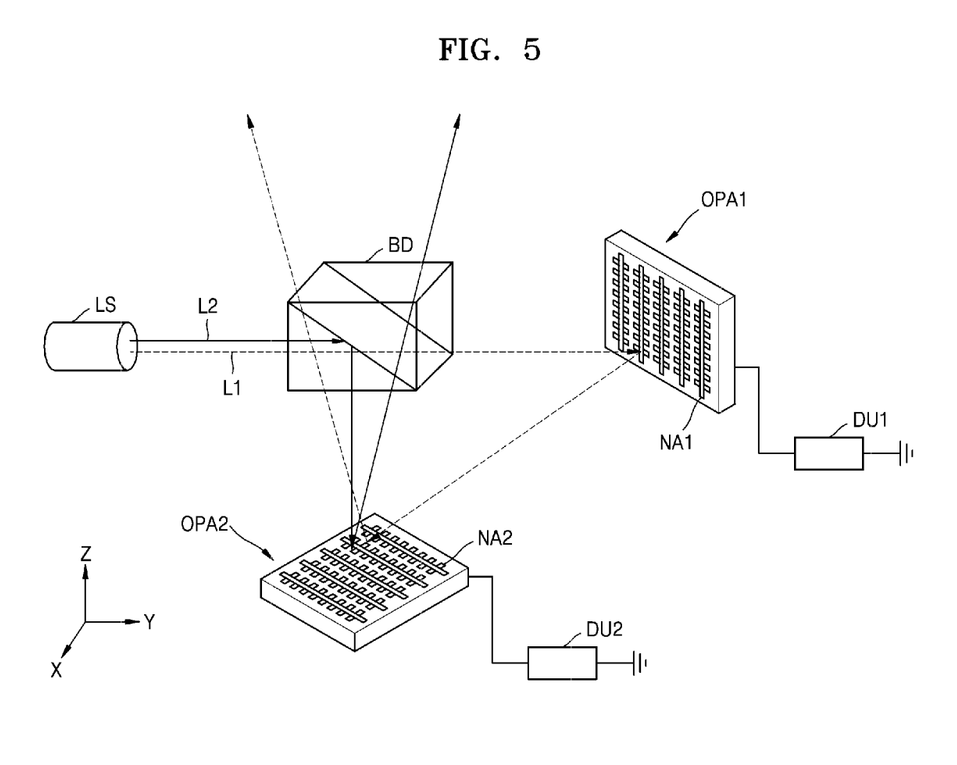
FIG. 5 is a schematic view showing changes of illumination directions of first light and second light according to changes of potentials applied to first and second nano antennas by first and second driving units, according to an example embodiment.

FIG. 5 is a schematic view showing changes of illumination directions of the first and second lights L1 and L2 according to changes of potentials applied to the first and second nano antennas NA1 and NA2 by the first and second driving units DU1 and DU2, according to an example embodiment.

Referring to FIG. 5, an optical scanning device may include the first driving unit DU1 that applies a potential to the first nano antennas NA1, and the second driving unit DU2 that applies a potential to the second nano antennas NA2. The irradiation direction of the first light L1 from the optical scanning device may be changed by changing the potential applied to the first nano antennas NA1. The irradiation direction of the second light L2 from the optical scanning device may be changed by changing the potential applied to the second nano antennas NA2.

In the optical scanning device described with reference to FIGS. 1 through 5, it is unnecessary to move the first and second optical modulators OPA1 and OPA2 to change the irradiation direction of the first light L1 and the second light L2. Accordingly, spaces for moving members may be saved when compared to a general reflection material that is used, and thus, the optical scanning device may be miniaturized. The travelling direction of the first light L1 and the travelling direction of the second light L2 may be controlled independently from each other by controlling a potential being applied by the first driving unit DU1 and a potential being applied by the second driving unit DU2.

Figure 6:
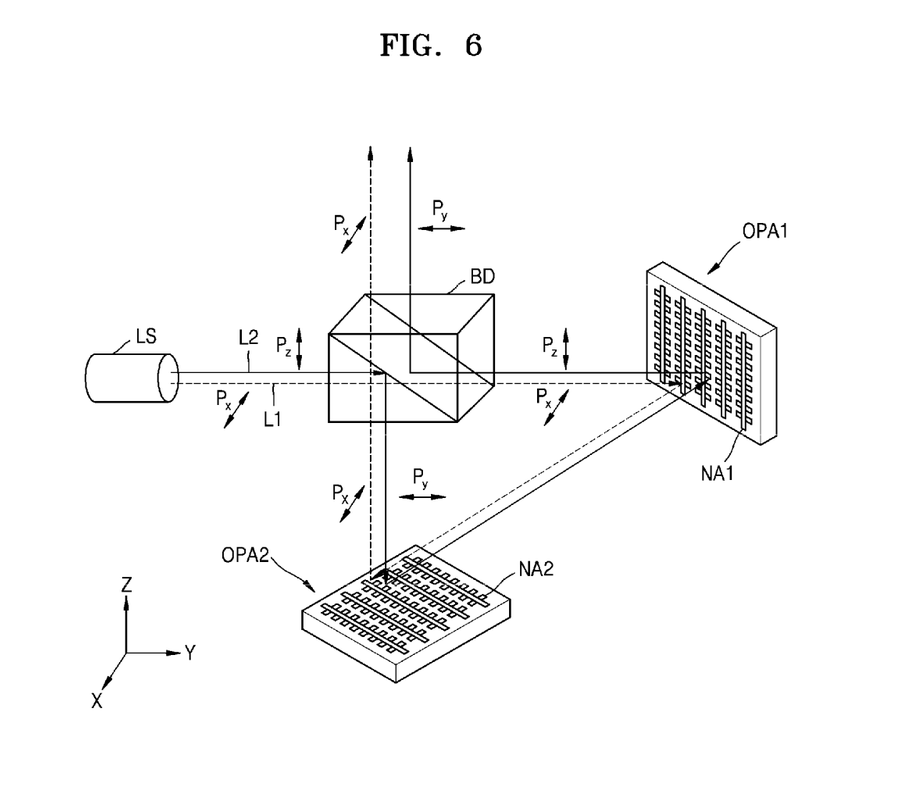
FIG. 6 is a view showing a beam divider including a polarizing beam splitter, according to an example embodiment.

FIG. 6 is a view showing the beam divider BD including a polarizing beam splitter, according to an example embodiment.

Referring to FIG. 6, of light emitted from the light source LS, the first light L1 may have an x-axis direction polarized light $P_x$, and the second light L2 may have a z-axis direction polarized light $P_z$. The polarizing beam splitter included in the beam divider BD may transmit the first light L1 having the x-axis direction polarized light $P_x$ and may reflect the second light L2 having the z-axis direction polarized light $P_z$.

The first optical modulator OPA1 is configured to selectively modulate the phase of the first light L1. The first optical modulator OPA1 may be configured to selectively modulate a phase of light having the x-axis direction polarized light $P_x$. For example, the formation direction of the sub-channel electrodes SUCHE included in the first nano antennas NA1 of the first optical modulator OPA1 may include a component parallel to the x-axis direction. However, the formation direction of the channel electrode CHE included in the first nano antennas NA1 may be substantially parallel to the z-axis direction. Accordingly, the first optical modulator OPA1 may reflect the second light L2 without any phase modulation.

The second optical modulator OPA2 may be configured to selectively modulate the phase of the second light L2. The second optical modulator OPA2 may be configured to selectively modulate a phase of light having a y-axis direction polarized light $P_y$. For example, the formation direction of the sub-channel electrodes SUCHE included in the second nano antennas NA2 may include a component parallel to the y-axis direction.

Figure 7:
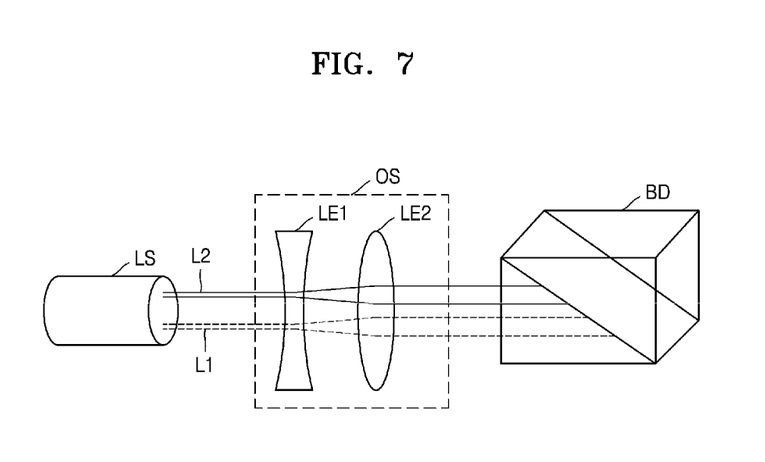
FIG. 7 is a view showing an optical system additionally provided between a light source and a beam divider of FIG. 1, according to an example embodiment.

FIG. 7 is a view showing an optical system OS additionally provided between the light source LS and the beam divider BD of FIG. 1, according to an example embodiment.

Referring to FIG. 7, the optical scanning device may further include the optical system OS between the light source LS and the beam divider BD to control the size of a cross-section of light emitted from the light source LS. The optical system OS may include a plurality of lenses LE1 and LE2. In FIG. 7, a case in which a concave lens LE1 and a convex lens LE2 are sequentially provided from the light source LS is depicted. In this case, the cross-section of the light may be expanded.

Figure 8:
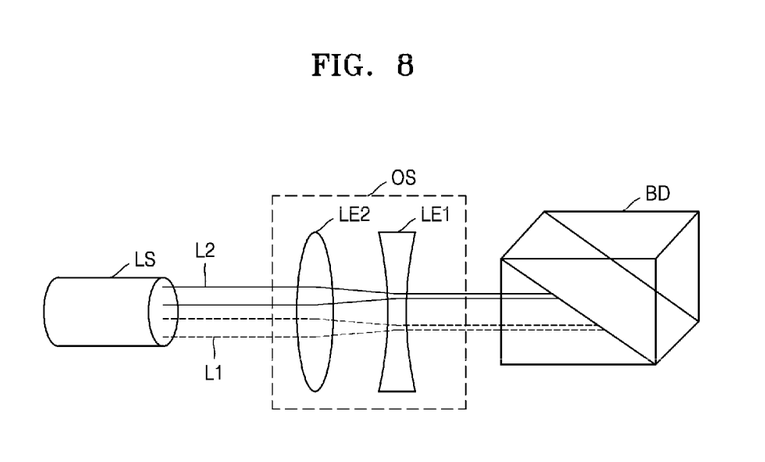
FIG. 8 is a view showing the optical system of FIG. 7, according to another example embodiment.

FIG. 8 is a view showing the optical system OS of FIG. 7, according to another example embodiment.

Referring to FIG. 8, the convex lens LE2 and the concave lens LE1 are sequentially provided from the light source LS. In this case, the cross-section of the light may be reduced.

The optical systems OS shown in FIGS. 7 and 8 are examples, and thus, the numbers and types of the lenses that may be included in the optical system OS are not limited. Also, the optical system OS may include a thin lens using a meta-surface instead of an optical lens. The optical system OS may be provided not only between the light source LS and the beam divider BD, but also between the beam divider BD and the first optical modulator OPA1, between the beam divider BD and the second optical modulator OPA2, and between the first optical modulator OPA1 and the second optical modulator OPA2.

Up to now, the optical scanning device according to the example embodiments has been described with reference to FIGS. 1 through 8. According to the example embodiments, the optical scanning device may independently control irradiation directions of the first and second lights L1 and L2 having wavelength range components different from each other. Also, the volume of the optical scanning device may be reduced.

Figure 9:
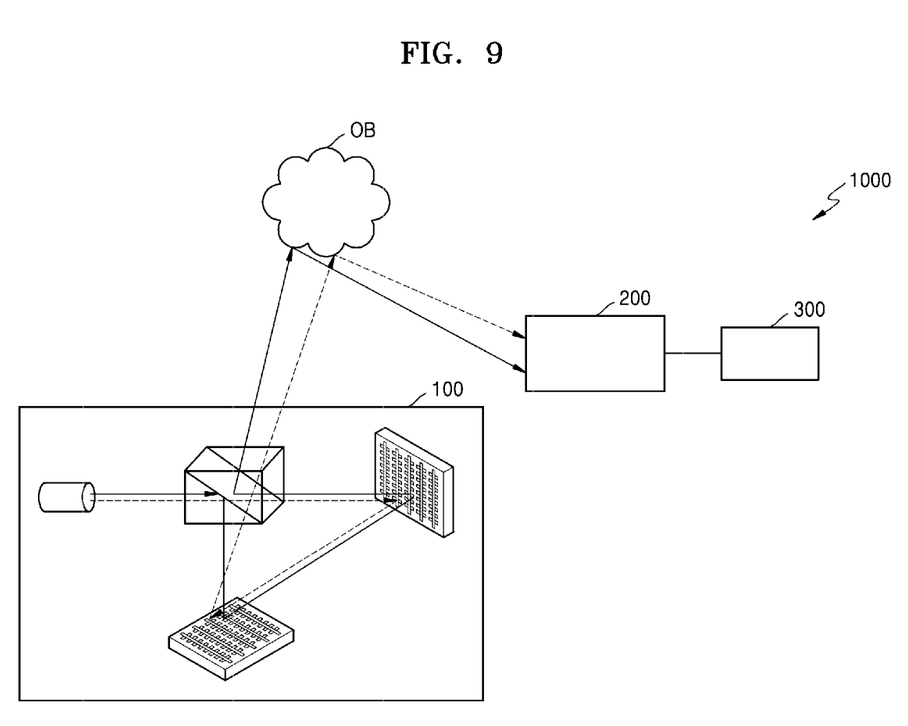
FIG. 9 is a schematic view of a LIDAR system including an optical scanning device, according to an example embodiment.

FIG. 9 is a schematic view of a LIDAR system 1000 including the optical scanning device 100, according to an example embodiment.

Referring to FIG. 9, the LIDAR system 1000 according to the current example embodiment may include the optical scanning device 100, and a light measuring device 200 that measures light reflected at an object OB by first light L1 irradiated to the object OB and measures light reflected at the object OB by second light L2 irradiated to the object OB from the optical scanning device 100. The LIDAR system 100 may further include a processor 300 that extracts information about either one or both of location and speed of the object OB from the measurement result of the light measuring device 200.

The optical scanning device 100 may independently control the irradiation directions of the first light L1 and the second light L2. The first light L1 may include a first wavelength range component and the second light L2 may include a second wavelength range component.

For example, the first wavelength range may include in a wavelength range from 850 nm to 950 nm. The first wavelength range described above may be favorable to a measurement resolution of the LIDAR system 1000, but the absorption rate of moisture in the air is relatively high and scattering by snow relatively easily occurs. Accordingly, the first light L1 may be suitable for precisely analyzing an object OB located nearby.

The second wavelength range may include a wavelength range from 1300 nm to 1550 nm. The second wavelength range described above may provide a relatively low resolution, but the absorption rate of moisture in the air is relatively low and scattering by snow does not relatively easily occur. Accordingly, the second light L2 may be suitable for analyzing an object OB located far away.

The optical scanning device 100 may independently control the travelling direction of the first light L1 and the travelling direction of the second light L2 by appropriately controlling a potential applied to the first nano antennas NA1 of the first optical modulator OPA1 by the first driving unit DU1, and a potential applied to the second nano antennas NA2 of the second optical modulator OPA2 by the second driving unit DU2. The degree of freedom in measurement of the LIDAR system 1000 may be increased because the optical scanning device 100 independently controls the travelling direction of the first light L1 and the travelling direction of the second light L2.

The light measuring device 200 may be a light receiving element that emits an electrical signal by receiving light. For example, the light measuring device 200 may include an avalanche photo diode (APD) or a single photon avalanche diode (SPAD). The light measuring device 200 may have various configurations. According to an example embodiment, the light measuring device 200 may also include an analog front end (AFE) or a time digital counter (TDC) respectively corresponding to the APD or SPAD. The above descriptions are examples, that is, the light measuring device 200 may include a different element that changes received light to an electrical signal.

The processor 300 may extract information about either one or both of location and speed of the object OB from the measurement result of the light measuring device 200. For example, the processor 300 may extract information about a distance between an object OB and the LIDAR system 1000 by using a time-of-flight (TOF) method. The processor 300 may extract information about the speed of an object OB by calculating a frequency shift of reflected light by using the Doppler Effect.

Up to now, an optical scanning device according to the example embodiments and a LIDAR system including the optical scanning device has been described with reference to FIGS. 1 through 9. According to the example embodiments described above, the optical scanning device that independently controls the travelling directions of first and second lights may be provided. Also, the volume of the optical scanning device may be reduced. Because the optical scanning device independently controls the travelling directions of the first and second lights, the degree of freedom in measurement and the measurement precision may be increased.

In addition, the example embodiments may also be implemented through computer-readable code and/or instructions on a medium, e.g., a computer-readable medium, to control at least one processing element to implement any of the above-described example embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to example embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

While this inventive concept has been shown and described with reference to the example embodiments thereof, it will be understood by those of ordinary skill in the art that various changes in form and details may be made therein without departing from the spirit and scope of the inventive concept as defined by the appended claims. The example embodiments may be considered in a descriptive sense only and not for purposes of limitation. Therefore, the scope of the inventive concept is defined not by the detailed description but by the appended claims, and all differences within the scope will be construed as being included in the inventive concept.

What is claimed is:

1. A light detection and ranging (LIDAR) system comprising:
    an optical scanning device configured to irradiate, to an object, first light in a first wavelength range and second light in a second wavelength range, and control an irradiation direction of the first light and an irradiation direction of the second light;
    a light measuring device configured to measure light that is reflected from the object to which the first light and the second light are irradiated; and
    a processor configured to determine information of either one or both of a location and a speed of the object, based on the measured light,
    wherein the optical scanning device comprises:
        a light source configured to emit the first light and the second light;
        a beam divider configured to:
            receive the first light, and allow the first light received by the beam divider to travel in a first direction; and
            receive the second light, and allow the second light received by the beam divider to travel in a second direction different from the first direction;
        first nano antennas configured to receive the first light, and modulate a phase of the first light received by the first nano antennas to change a travelling direction of the first light received by the first nano antennas; and
        second nano antennas configured to receive the second light, and modulate a phase of the second light received by the second nano antennas to change a travelling direction of the second light received by the second nano antennas,
    wherein the first light modulated by the first nano antennas and the second light modulated by the second nano antennas are irradiated to an outside of the optical scanning device through the beam divider.

2. The LIDAR system of claim 1, wherein the first wavelength range comprises a wavelength range from 850 nm to 950 nm, and the second wavelength range comprises a wavelength range from 1300 nm to 1550 nm.

3. The LIDAR system of claim 1, wherein the beam divider comprises a dichroic mirror configured to transmit the first light received by the beam divider, and reflect the second light received by the beam divider.

4. The LIDAR system of claim 1, wherein the first nano antennas are disposed on a first substrate, and the second nano antennas are disposed on a second substrate.

5. The LIDAR system of claim 4, further comprising:
a first driving unit configured to apply a potential to the first nano antennas; and
a second driving unit configured to apply a potential to the second nano antennas,
wherein the travelling direction of the first light received by the first nano antennas are changed based on the potential applied by the first driving unit, and the travelling direction of the second light received by the second nano antennas are changed based on the potential applied by the second driving unit.

6. The LIDAR system of claim 4, wherein each of the first nano antennas and the second nano antennas comprises a channel electrode, and sub-channel electrodes disposed in a direction perpendicular to the channel electrode.

7. The LIDAR system of claim 1, further comprising an optical system interposed between the light source and the beam divider, the optical system being configured to control a size of a cross-section of each of the emitted first light and the emitted second light.

8. A light detection and ranging (LIDAR) system comprising:
an optical scanning device configured to irradiate, to an object, first light in a first wavelength range and second light in a second wavelength range, and control an irradiation direction of the first light and an irradiation direction of the second light;
a light measuring device configured to measure light that is reflected from the object to which the first light and the second light are irradiated; and
a processor configured to determine information of either one or both of a location and a speed of the object, based on the measured light,
wherein the optical scanning device comprises:
a light source configured to emit the first light and the second light;
a beam divider configured to:
receive the first light, and allow the first light received by the beam divider to travel in a first direction; and
receive the second light, and allow the second light received by the beam divider to travel in a second direction different from the first direction;
first nano antennas configured to receive the first light, and modulate a phase of the first light received by the first nano antennas to change a travelling direction of the first light received by the first nano antennas; and
second nano antennas configured to receive the second light, and modulate a phase of the second light received by the second nano antennas to change a travelling direction of the second light received by the second nano antennas,
wherein the first nano antennas are further configured to emit the first light of which the travelling direction is changed, to the second nano antennas, the second nano antennas are further configured to receive the first light emitted from the first nano antennas, and reflect the first light received by the second nano antennas; and emit the second light of which the travelling direction is changed, to the first nano antennas, and the first nano antennas are further configured to receive the second light emitted from the second nano antennas, and reflect the second light received by the first nano antennas.

9. A light detection and ranging (LIDAR) system comprising:
an optical scanning device configured to irradiate, to an object, first light in a first wavelength range and second light in a second wavelength range, and control an irradiation direction of the first light and an irradiation direction of the second light;
a light measuring device configured to measure light that is reflected from the object to which the first light and the second light are irradiated; and
a processor configured to determine information of either one or both of a location and a speed of the object, based on the measured light,
wherein the optical scanning device comprises:
a light source configured to emit the first light and the second light;
a beam divider configured to:
receive the first light, and allow the first light received by the beam divider to travel in a first direction; and
receive the second light, and allow the second light received by the beam divider to travel in a second direction different from the first direction;
first nano antennas configured to receive the first light, and modulate a phase of the first light received by the first nano antennas to change a travelling direction of the first light received by the first nano antennas; and
second nano antennas configured to receive the second light, and modulate a phase of the second light received by the second nano antennas to change a travelling direction of the second light received by the second nano antennas,
wherein the first light comprises a first polarized light, the second light comprises a second polarized light, and the beam divider comprises a polarization beam splitter configured to transmit the first light received by the beam divider, and reflect the second light received by the beam divider.

10. The LIDAR system of claim 9, wherein the first nano antennas are configured to modulate the first light comprising the first polarized light, and the second nano antennas are configured to modulate the second light comprising the first polarized light.

* * * * *